United States Patent [19]

Shibaoka

[11] Patent Number: 5,039,234
[45] Date of Patent: Aug. 13, 1991

[54] DOCUMENT PROCESSING EQUIPMENT

[75] Inventor: Hideo Shibaoka, Yokohama, Japan

[73] Assignee: Canon Kabushiki Kaisha, Tokyo, Japan

[21] Appl. No.: 498,748

[22] Filed: Mar. 26, 1990

[30] Foreign Application Priority Data

Mar. 29, 1989 [JP] Japan .................................. 1-74897

[51] Int. Cl.⁵ ............................................... B41J 5/30
[52] U.S. Cl. ...................................... 400/63; 364/518; 400/279; 400/697
[58] Field of Search ................. 400/63, 279, 904, 695, 400/696, 697, 697.1; 364/518, 519, 570, 900

[56] References Cited

U.S. PATENT DOCUMENTS

| | | | |
|---|---|---|---|
| 4,031,519 | 6/1977 | Findley | 400/63 |
| 4,607,966 | 8/1986 | Ueno et al. | 400/63 |
| 4,639,151 | 1/1987 | Ueno et al. | 400/63 |
| 4,725,158 | 7/1988 | Ueda et al. | 400/63 |
| 4,789,255 | 12/1988 | Hays et al. | 400/63 |
| 4,818,131 | 4/1989 | Sakai | 400/63 |
| 4,839,827 | 6/1989 | Hirata et al. | 364/518 |
| 4,842,428 | 6/1989 | Suzuki | 400/697 |
| 4,859,091 | 8/1989 | Ueda | 400/63 |
| 4,861,175 | 8/1989 | Hori et al. | 400/63 |
| 4,863,296 | 9/1989 | Yamakawa et al. | 400/63 |
| 4,907,173 | 3/1990 | Yamada et al. | 400/63 |
| 4,907,900 | 3/1990 | Duncan, IV | 400/63 |
| 4,913,566 | 4/1990 | Sakai et al. | 400/63 |
| 4,915,546 | 4/1990 | Kobayashi et al. | 400/697 |
| 4,918,648 | 4/1990 | Taguchi et al. | 400/63 |
| 4,955,734 | 9/1990 | Nakazawa | 400/63 |

Primary Examiner—Eugene H. Eickholt
Attorney, Agent, or Firm—Fitzpatrick, Cella, Harper & Scinto

[57] ABSTRACT

Document processing equipment comprising an input device to input enlarged character data covering a plurality of lines, a memory to store enlarged character data input, a printing/erasing device which can print or erase the stored enlarged character data in the form of enlarged character pattern on a recording medium, a commanding device to instruct erasing of a plurality of enlarged character patterns printed on the recording medium by the printing/erasing device and a control device to erase en bloc the enlarged character pattern covering several lines printed on the recording medium line by line in response to the erasing instruction given by the commanding device.

10 Claims, 7 Drawing Sheets

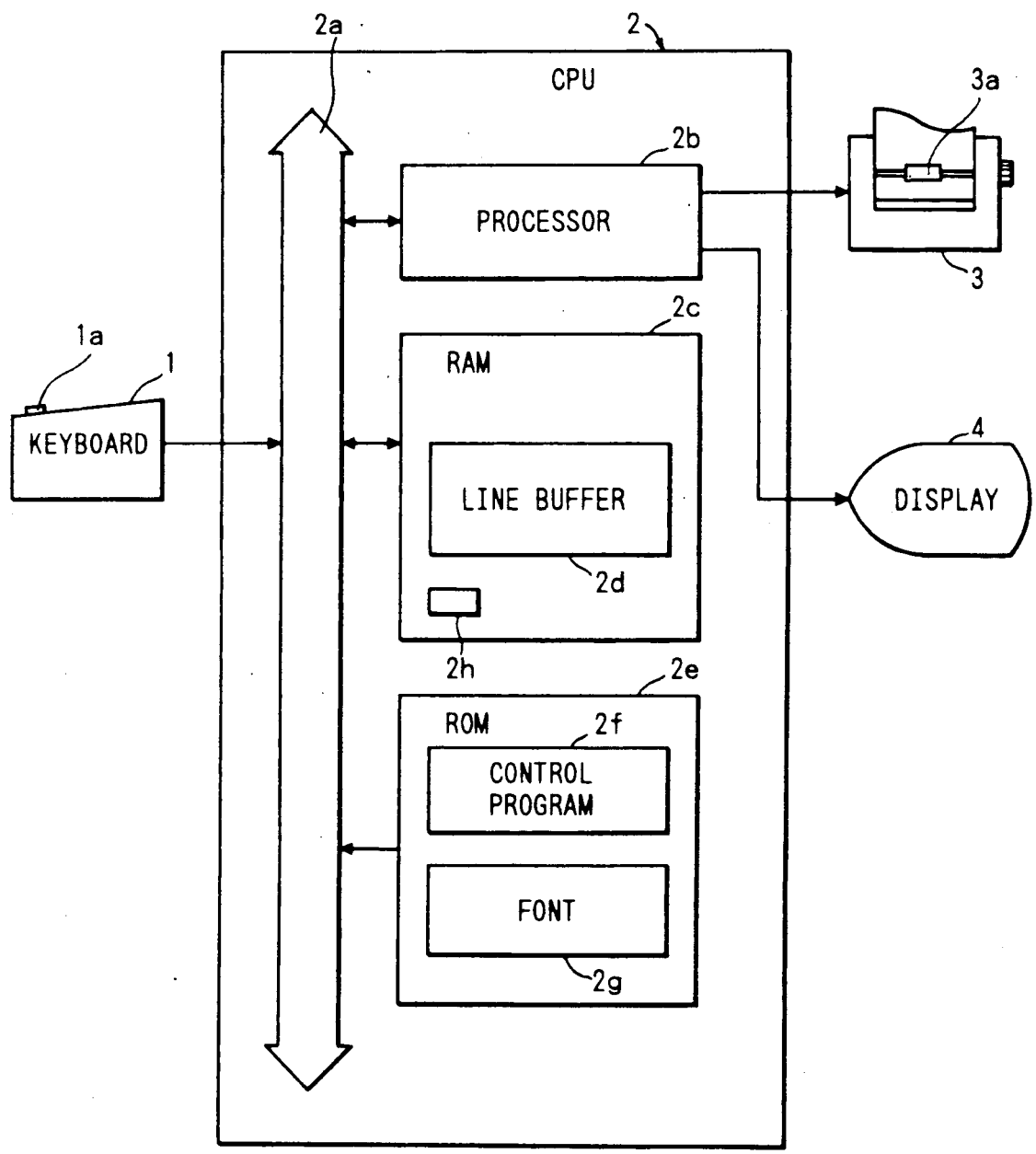

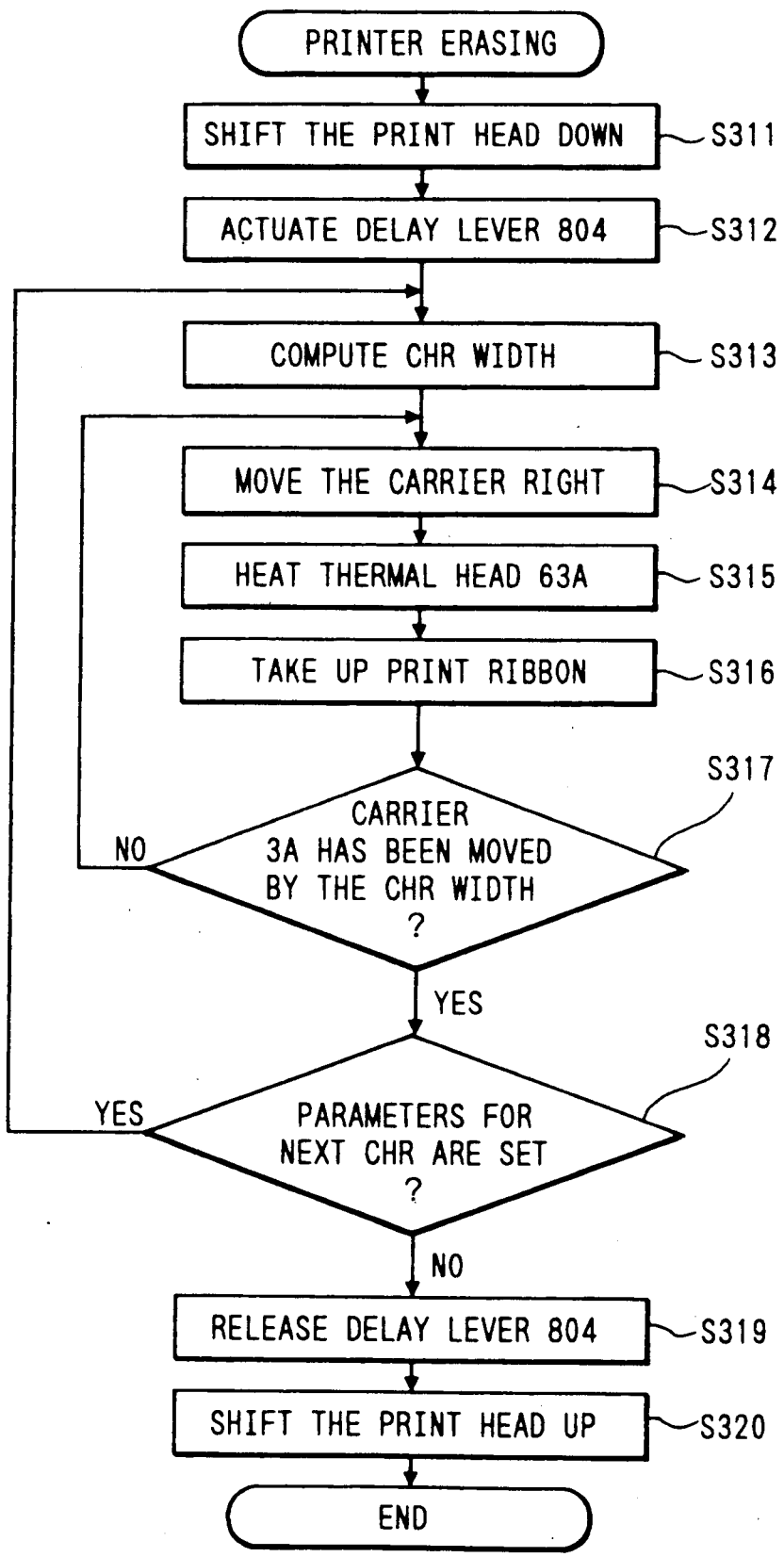

DOCUMENT PROCESSING EQUIPMENT

BACKGROUND OF THE INVENTION

1. Field of the Invention

The present invention relates to document processing equipment which executes erasing of one character line en bloc and line by line, the said character line being printed on a sheet of paper and composed of the enlarged characters covering several lines.

2. Related Background Art

The printing systems presently employed for document processing such as electronic typewriter are divided into two types, one being an impact system wherein daisy wheel etc. is struck by a hammer to transfer the ink from the ribbon coated with an ink to a sheet of paper and the thermal transcription system wherein thermal head etc. is heated so that ink is transferred from the ribbon coated with an ink to a sheet by heat. When printing is executed with such document processing equipment for the printing of enlarged characters such as characters, enlarged 4 times by using double character width and double character height or characters enlarged 9 times by using triple character width and triple character height, one character is divided to cover a plural number of lines, such as two or three lines depending on the width of ink ribbon and it is printed by shifting the sheet in the longitudinal direction of the sheet. Likewise, to erase an enlarged character, erasing is done over a plural number of lines by shifting the sheet in longitudinal direction of the sheet. On the other hand, erasing en bloc of a character line printed on a sheet is executed by specifying the scope of words in the document memory and erasing the characters contained in such scope as for every character unit. FIG. 2 is the model drawing to explain the order of steps of erasing en bloc a word composed of characters enlarged by 4 times. FIG. 2A is an example of performance of erasing en bloc of a character line by conventional method wherein steps ① to ⑥ are executed by this order. In the Figure, step ① is erasing of lower half of A, ②—upper half of A, ③—lower half of B, ④—upper half of B, ⑤—lower half of C and ⑥—upper half of C. At this time, at the change-over of action at the end of each step, namely, at the change-over from ① to ②, ② to ③, ③ to ④, ④ to ⑤, ⑤ to ⑥ and at the end of ⑥, the sheet is shifted in the longitudinal direction. However, in the aforesaid example, when the characters composing the character line are enlarged characters, the sheet is shifted in longitudinal direction at each performance of erasing of one character and it brings about the following problems:

(1) Processing speed is slow.
(2) Accuracy of erasing is low.
(3) Power consumption is large.

SUMMARY OF THE INVENTION

The present invention has been developed to solve the aforesaid problems and its objective is to propose a document processing equipment wherein the frequency of shifting of a sheet in longitudinal direction is minimized by conducting en bloc erasing of enlarged characters printed on a sheet of paper line by line.

Another objective of the present invention is to propose a document processing equipment which can increase erasing speed and improve erasing accuracy thus saving the power consumption, by executing en bloc erasing of enlarged character by dividing it into line units.

Another objective of the present invention is to propose a document processing equipment wherein erasing en bloc a character line in the desired range of the word etc. composed of enlarged characters is executed at every line unit.

BRIEF DESCRIPTION OF THE DRAWING

FIG. 1 is a block diagram to show the construction of the present example of embodiment.

FIGS. 8A and 8B are the drawings to explain the erasing process of thermal transcription system and FIG. 9 is the flow chart to indicate the control step of the erasing action.

DETAILED DESCRIPTION OF THE EMBODIMENT

Figure 2A:
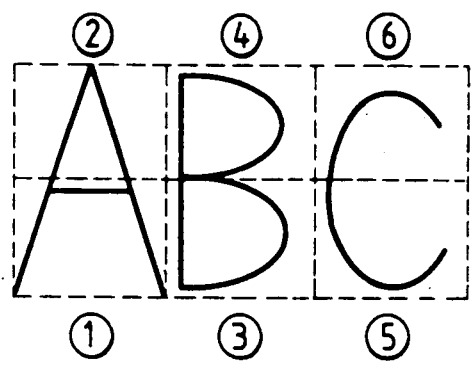
FIGS. 2A and 2B are the model drawings to indicate an example of erasing action.

Hereunder is given the detailed explanation of a preferred embodiment of the present invention in reference to the attached drawings.

Explanation of Composition

FIG. 1

FIG. 1 is a block diagram to indicate the composition of the document processing equipment of the present example of this embodiment. 1 is an input section composed of key board etc., wherein character keys and command keys not shown in the drawing are arranged at the specified position and key code data are input into the system bus 2a when these keys are depressed. 2 is the central processing unit (CPU) to process the document data which is composed of system bus 2a, processor 2h, random access memory (RAM) 2c, read only memory (ROM) 2e etc. System bus 2a plays the role to transmit the key code data input by key board 1 and the data of RAM 2c or RAM 2e to the processor 2b. Processor 2b controls the actions of each unit according to the contents of control program 2f which is present in ROM 2e. RAM 2c is the memory to store the data to be processed by processor 2b and it has the line buffer 2d which stores the input document data.

2b in RAM 2c is an area to store the position data of the character in the pointer to be stated later and the position data of the carrier. ROM 2e stores the programs 2f of the processor 2b to be stated later (control procedures shown in FIGS. 3, 4, 5, 6 and 9) and has memory 2g which stores the dot pattern of the character being printed, etc. 3 is the printer to output the formed documents stored in the line buffer 2d and thermal head and ink ribbon for printing are provided to the carrier 3a. 4 is the display device to display the formed documents etc. stored in line buffer 2d.

Explanation of en bloc erasing

FIGS. 3-9

Next, the performance of en bloc erasing of the present equipment composed as aforesaid is explained according to the control procedures shown in FIGS. 3 to 6 and 9.

Character data input one after another by the operator at the key board 1 are stored in line buffer 2d via processor 2b and they are printed out by printer 3. When carrier 3a is on the word composed of characters enlarged 4 times and the key 1a to order erasing en bloc of the word present on key board 1 is depressed, the key code data input by key board 1 are delivered to the processor 2b through system bus 2a. CPU 2b judges that the key code data are the command for execution of erasing en bloc the word and transfers the control to the en bloc erasing of the word in the control program 2f.

Figure 3:
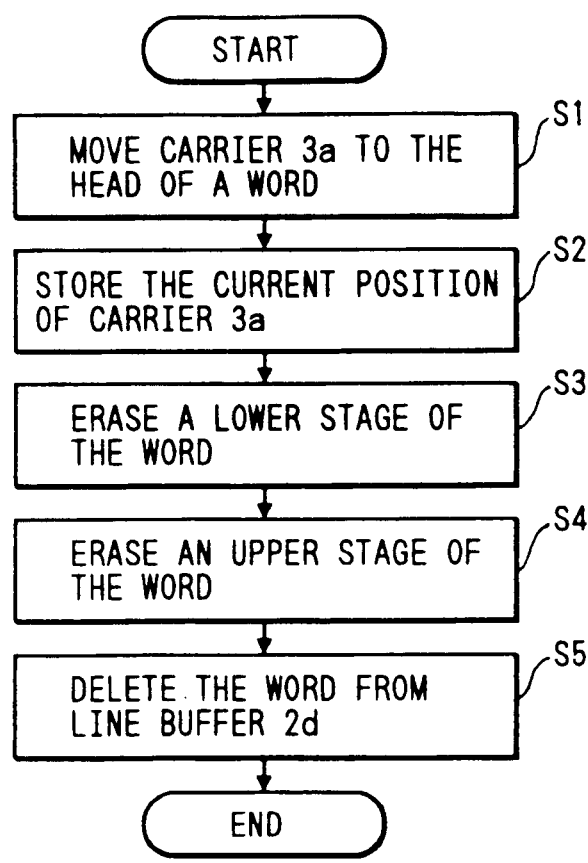
FIGS. 3 to 6 are the flow charts to indicate the order of control in the present example of embodiment.

FIG. 3 is the flow chart to indicate the control procedures of en bloc erasing of the word to be executed by CPU 2b. In FIG. 3, step S1 shows the step of moving the carrier 3a to the position of printing head character of the word in reference to the character data stored in line buffer 2d.

Step S2 shows the step of storing the printing position of the head character of the word to be erased, which becomes the position of the carrier at the end of en bloc erasing of the word, in the temporary memory in RAM 2c. Step S3 indicates the step to execute erasing of the lower line or the lower stage during the erasing of the word made of enlarged characters covering 2 lines. The succeeding step S4 shows the step to execute erasing of the upper line or the upper stage during the erasing of the word made of enlarged characters covering two lines. In step S5, the data of erased word are deleted from the line buffer 2d and the state of printing and display of printer 3 and display device 4 are adjusted with the contents of the line buffer 2d.

Figure 4:
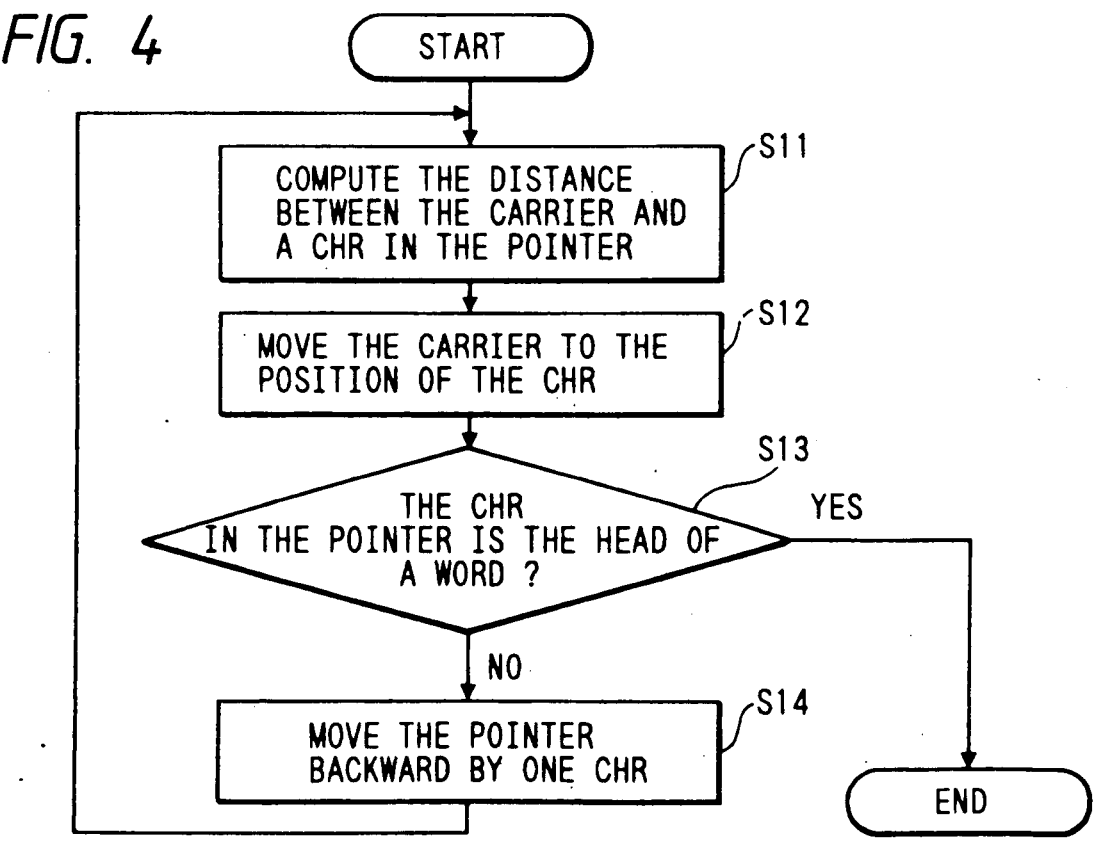

FIG. 4 shows the concrete control procedures for the movement of carrier 3a to the position of head character of the word of 8 step S1 indicated in FIG. 3.

The character data already printed are stored in the line buffer 2d as the data of the kind and position of the character. The storing position on line buffer 2d which indicates the character printed at the left side and closest to the position of carrier a is indicated by the pointer and the position data of such character and that of carrier 3a are stored in the temporary memory 2h in RAM 2c.

In step S11, the distance by which the carrier 3a should be moved is obtained in reference to the contents of temporary memory 2h. Then processing proceeds to step S12 wherein the carrier is moved by the distance obtained as aforesaid. During the motion of carrier 3a, the thermal head is in a raised state and winding of the printing ribbon provided at the printer 3 is not executed.

In step S13, judgment is made whether the character at the position of carrier 3a is the character at the head of the word or not and the succeeding actions are determined according to the results of such judgment. Since the character at the position of carrier 3a is verified by the pointer on the line buffer 2d, whether a character is the head character of a word or not is judged in such way that CPU 26 judges whether the position relation (distance) between the character presently in the pointer and the character immediately preceding such character represents the state of the end of the word or not in reference to the kind of character. The condition to constitute the end of the word are one of the following 3 states:

(1) The character immediately preceding the character in the pointer is a blank character.
(2) The distance between the character in the pointer and the character immediately preceding such character differs from the calculated distance between characters.
(3) There exists no character on the same line and at the left side of the character in the pointer.

When the above three items are checked and either one of the three conditions is satisfied, the processing of step S1 ends. When none of the aforesaid conditions are satisfied, it judges that the character presently in the pointer is not the head character of the word. Then processing proceeds to step S14 and the pointer on the line buffer 2d is moved back by one character, steps S11–S13 are repeated and carrier 3a is moved to the head character of the word.

In the step S2, the present position by carrier 3a is memorized in RAM 2c. It is done for the re-entry of the character after erasing of a word.

Figure 5:
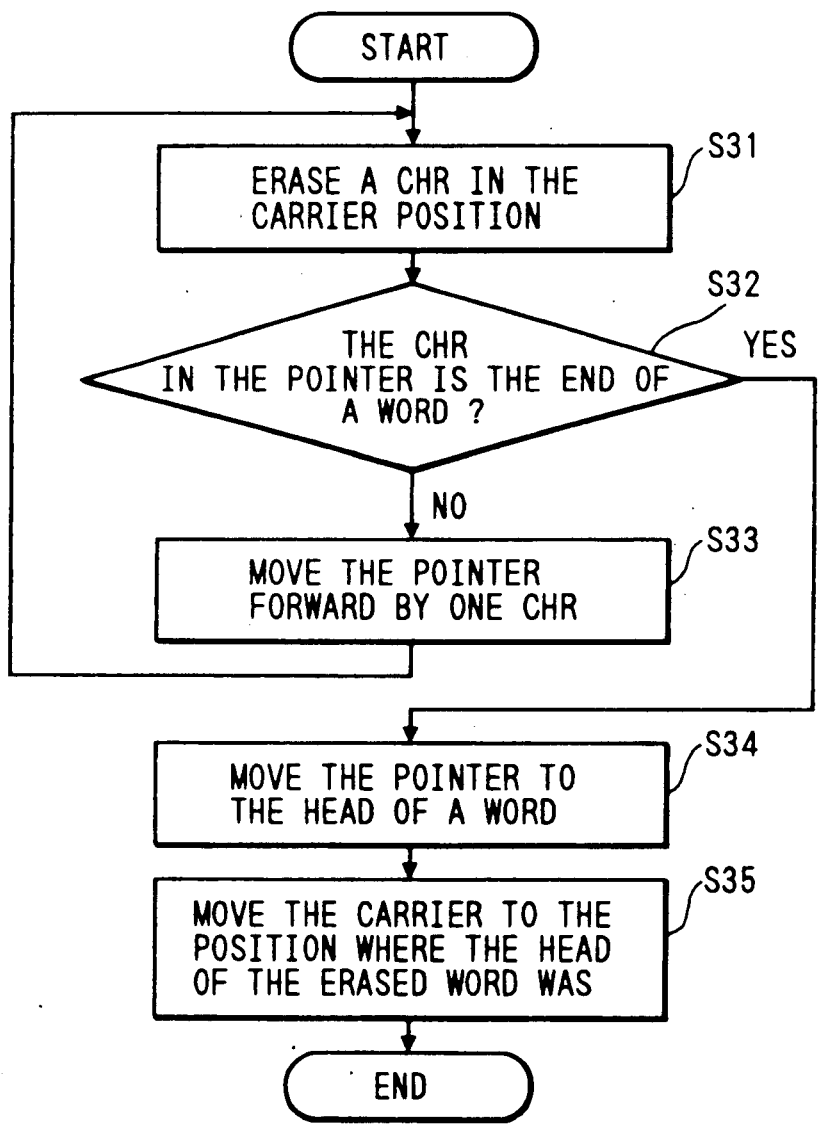

FIG. 5 is a flow chart to indicate the concrete control procedures for the execution of erasing of the lower stage of the word in step 3 indicated in FIG. 3.

In this step S31, erasing of the character printed at the position of carrier 3a is executed. During erasing, judgment 3a is moved rightward with its thermal head kept down and simultaneously, the printing ribbon set on the printer 3 is wound up. In the case of the impact type printer, it is necessary to move the carrier 3a to the position of the succeeding character after the above step but in the case of thermal transcription type printer, such step is unnecessary as the thermal head moves from left to right at the time of erasing. It is also unnecessary to hold thermal head up or down for the succeeding erasing of characters. In step S32, judgement is made whether the erased character is the character at the end of the word or not and succeeding actions are determined based on the results of such judgment. Whether the erased character is the end character of the word or not is judged by checking the following three conditions:

(1) The character immediately following the erased character is a blank character.
(2) The distance between the erased character and the character immediately following thereto differs from the calculated distance between characters.
(3) There exists no character on the same line and at the right side of the erased character.

When the above three conditions are checked and if none of them are satisfied, it is judged that the erased character is not the end character of the word. Then in step S33, the pointer is set at the character to be erased next and the step S31, for en bloc erasing of the lower stage of the word is repeated. If one of the above condition is satisfied, the en bloc erasing of the lower stage of the word is regarded to have been completed and the processing proceeds to step S34. At step S34, the pointer is again returned to the position of the head of the word to execute en bloc erasing of the upper stage of the word. Then the mode proceeds to step S35 and the carrier 3a is moved to the position where the head of the erased word was printed, in reference to the value stored in RAM 2c at step S2.

Figure 6:
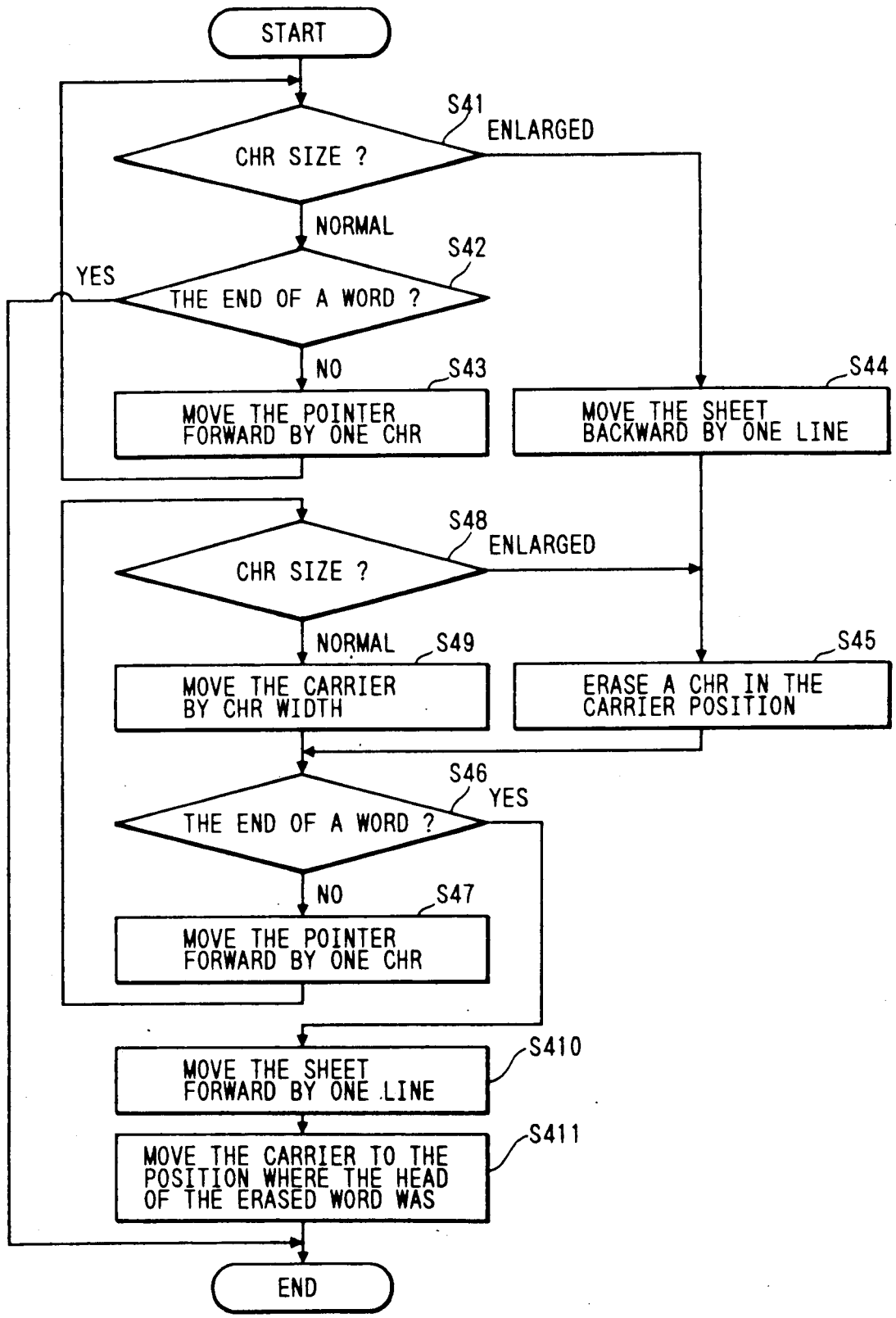

FIG. 6 is the flow chart to indicate the concrete control procedure of erasing of the upper stage of the word in step S4 indicated in FIG. 3.

At step S41, the size of the character in the pointer is checked. When it is found that the character is not an enlarged character, the mode proceeds to step S42 and judgment is made whether the character in the pointer is the end of the word or not as in the case of step S32 stated above. If it is the end of the word, it is concluded that the word to be erased has no enlarged character and thus erasing of the upper stage ends. If it is not the end of the word, the mode proceeds to step S43, the pointer to indicate the position in the line buffer 2d is moved to the succeeding character and processing is repeated until an enlarged character is found.

When the results of judgement in step S41 show that the character is an enlarged character, the mode proceeds to step S44. At step S44, the position of the sheet is moved backward by one line to erase the upper stage of the enlarged character and the thermal head is set at the upper stage of the character line. Then at step S45, the character printed at the present carrier position is erased as the case of erasing in step S31, and at the same time carrier 3a is shifted to the next printing position. In step S46, judgment is made whether the character in the pointer is the end of the word or not as in the case of step S42 and then the succeeding action are determined based on the results of such judgement. If it is not an end of the word, the mode proceeds to step S49 and the pointer to indicate the position of line buffer 2d is moved to the succeeding character as in the case of step S43. At step S48, checking similar to that of step S41 is executed and if the character in the pointer is an enlarged character, mode is promoted to the aforesaid step S45 for erasing. However, if the character is not an enlarged character, mode proceeds to step S49 and carrier 3a is shifted rightward for the width of the character in the pointer by omitting erasing action, to set the carrier at the printing position of the succeeding character. When erasing is completed up to the end of the word by the above processing, the mode is moved to step S410 and the sheet is moved by one line width in the direction opposite to the direction of feeding of sheet in step S44, and thermal head is set at the lower stage of the character line. At step S411, carrier 3a is moved to the position where the head of the erased word was printed in reference to the value stored in RAM 2c in S2 as in the case of the aforesaid step S35 and thus erasing of the upper stage of the word is completed.

When the aforesaid processing is over, the mode proceeds to step S5 and the data of the erased word are deleted from the line buffer 2d and the value of the distance between the character immediately preceding the erased word and the character immediately succeeding such word is renewed.

Figure 2B:
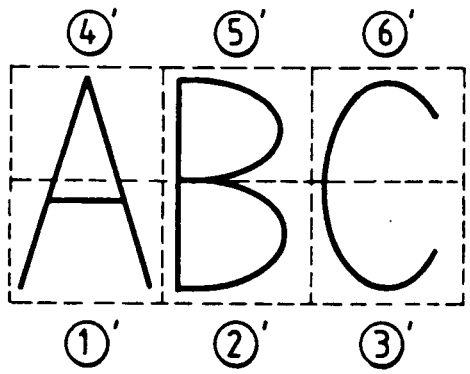

FIG. 2B is the drawing to show the order of steps of erasing the aforesaid enlarged character.

As indicated in the drawing, when erasing is done in the order of ①'-⑥' as shown in the drawing, movement of sheet in longitudinal direction is small and the processing speed increases as compared to the conventional system.

FIG. 7 is the drawing to illustrate the actual process of printing by the thermal transcription printer. In the FIG. 7 is the platen to support the sheet, S is the sheet, 63 is the printing head to execute printing or erasing and 63a is the thermal head which is the heated part of printing head 63. R is the ribbon, 900 is the substrate of ribbon R and 901 is the multiple ink layers. B1 is the recorded image.

Figure 7A:
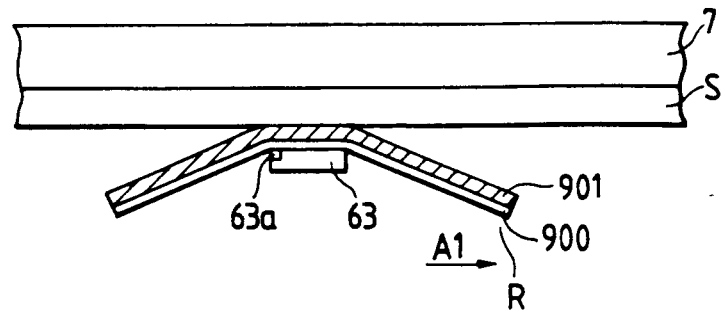
FIGS. 7A and 7B are the drawings to explain the printing process of the thermal transcription system.
Figure 7B:
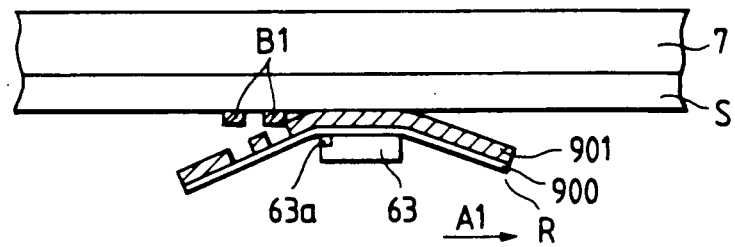

To be more concrete, as shown in FIG. 7A, with the printing head 63 held in depressed state, carrier 3a is moved to the direction of A1, printing ribbon R is wound up in the direction reverse to A1 and thermal head 63a is heated. By so doing, ink layer 901 in semi-molten state detaches from the substrate 900 and it is transferred to sheet S to form the image B1, thus executing printing as shown in FIG. 7B.

Figure 8A:
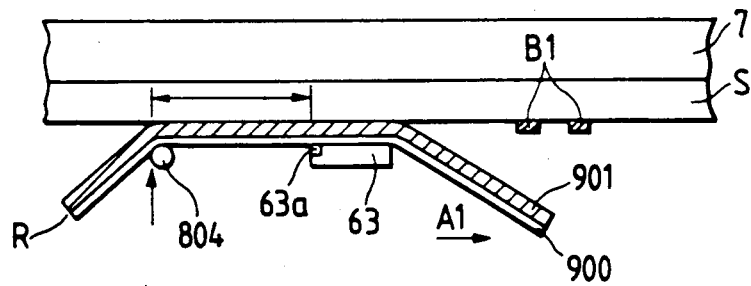
Figure 8B:
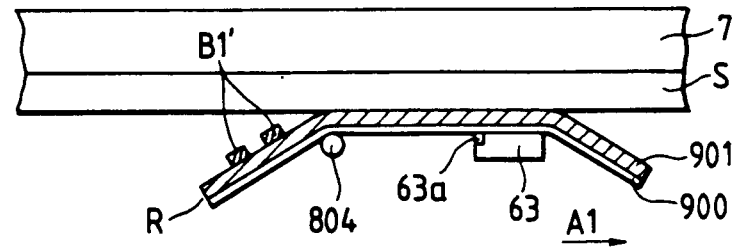

FIG. 8 is the drawing to illustrate the actual process of erasing by the thermal transcription type printer. 804 is the delay bar to delay defoliation of the ribbon. As illustrated in FIG. 8A, in the state where printing head 63 is kept down and delay bar 804 is projected, carrier 3a is moved to the direction of A1, printing ribbon R is wound up in the direction in reverse to the direction of A1 and thermal head 63a is heated thus turning ink layer 901 into semi-molten state, causing recorded image B1 stick to the head. Since the delay lever 804 is projected, transfer of ink layer 901 and recorded image B1 to the sheet S delays and as the head cools, the ink ceases to be in semi-molten state and contrary to the example of FIG. 7, ink layer 901 rips the recorded image B1 off the sheet S thus executing erasing shown in FIG. 8B.

FIG. 9 shows the control procedure of erasing action of the printer by actual interrupt processing as stated in step S1 of FIG. 5.

In step S311, printing head 63 is kept down as shown in FIG. 8 and delay lever 804 is caused to project to delay defoliation of the ribbon by step S312. Then the mode proceeds to step S313 and the width of the character to be erased stored in font 2g shown in FIG. 1 is checked. Based on thus obtained character width, the steps S314–316 are repeated.

At step S314, the carrier 3a is shifted rightward by one dot and at step S315, the thermal head 63a is heated to make the ink in a semi-molten state and whereby the print is ripped off. In step S316, printing ribbon R is wound up and in step S317, it is judged if the processing for the character width is over or not. When processing of one character width is over, processing is promoted to step S318, and judgment is made if the data of the character to be erased next are sufficient as the parameter to be given to the printer. If they are sufficient parameters, the mode returns to step S313, and erasing of the succeeding character is continued without raising the thermal head 63a and display lever 804. When erasing of a character is over but the data of the succeeding character are not yet set, the mode proceeds to step S319, delay lever 804 is lifted and printing head 63 is lifted in step S320 and the processing ends.

As detailed in the above, according to the present embodiment of the invention, en bloc erasing of a word composed of the characters enlarged to cover plural number of lines is executed by dividing the data line by line thus minimizing the frequency of moving of the sheet in longitudinal direction.

As the result, the following advantages are obtained:
(1) Improvement of processing speed
(2) Improvement of erasing accuracy
(3) Reduction of power consumption In the present embodiment of the invention, an example of en bloc erasing of the word composed of characters enlarged 4 times has been explained but this invention may be applied to increase the efficiency of erasing of the word composed of characters enlarged to cover more than 3 lines. For example, in order to execute en bloc erasing of the word composed of characters enlarged 9 times by enlarging character width 3 times and character height 3 times, dividing such character in line units, it is sufficient to simply add one more processing step after step S4 in the flow chart of FIG. 3.

In the present embodiment of the invention, en bloc erasing of the word is used as an example but the similar effect is obtained when character line in certain designated range is to be erased. For example, this invention may be applied also to the case where erasing action is done en bloc from left to right as against the continuous operation of one character erasing command key.

As explained above, according to the present invention, the frequency of shifting the sheet in longitudinal direction of the sheet can be minimized by dividing into one line units and executing en bloc erasing function of an enlarged character or character line covering plural number of lines.

Thus as the processing speed increases, erasing accuracy improves and power consumption is reduced.

What is claimed is:

1. A document processing apparatus comprising:
   input means for inputting a plurality of enlarged character data;
   memory means for storing the plurality of enlarged character data input by said input means;
   printing/erasing means which can print or erase the plurality of enlarged character data stored in said memory means in the form of a plurality of enlarged character patterns covering a plurality of lines on a recording medium;
   commanding means for instructing erasing of the plurality of enlarged character patterns printed on the recording medium by said printing/erasing means; and
   control means for controlling said printing/erasing means to erase en bloc and line by line the plurality of enlarged character patterns covering the plurality of lines printed on the recording medium in response to the erasing instruction of said commanding means.

2. An apparatus according to claim 1, wherein said printing/erasing means comprises a thermal transfer printer.

3. An apparatus according to claim 1, wherein said printing/erasing means comprises an impact printer.

4. An apparatus according to claim 1, wherein said control means further comprises means for erasing a plurality of enlarged character data corresponding to the plurality of enlarged character patterns on the recording medium erased by said printing/erasing means from said memory means.

5. An apparatus according to claim 1, further comprising character pattern memory means for storing a plurality of kinds of character patterns including enlarged character patterns.

6. A document processing apparatus comprising:
   input means for inputting a plurality of enlarged character data;
   memory means for storing the plurality of enlarged character data input by said input means and position data for printing of enlarged character patterns corresponding to the enlarged character data;
   printing/erasing means which can print or erase each of the plurality of enlarged character data stored in said memory means on a recording medium as the enlarged character pattern which covers a plurality of lines;
   commanding means for instructing erasing of the plurality of enlarged character patterns printed on the recording medium by said printing/erasing means in word units;
   detecting means for detecting the head position of a word consisting of the plurality of enlarged character patterns recorded on the recording medium according to an instruction for erasing given by said commanding means; and
   control means for controlling said printing/erasing means to erase en bloc and line by line the plurality of enlarged character patterns consisting of the word detected by said detecting means from the head position of such word.

7. An apparatus according to claim 6, wherein said printing/erasing means comprises a thermal transfer printer.

8. An apparatus according to claim 6, wherein said printing/erasing means comprises an impact printer.

9. An apparatus according to claim 6, wherein said control means further comprises means for erasing a plurality of enlarged character data corresponding to the plurality of enlarged character patterns on the recorded medium erased by said printing/erasing means from said memory means.

10. An apparatus according to claim 6, further comprising character pattern memory means for storing a plurality of kinds of character patterns including enlarged character patterns.

* * * * *

UNITED STATES PATENT AND TRADEMARK OFFICE
CERTIFICATE OF CORRECTION

PATENT NO. : 5,039,234

DATED : August 13, 1991

INVENTOR(S) : HIDEO SHIBAOKA

It is certified that error appears in the above-identified patent and that said Letters Patent is hereby corrected as shown below:

COLUMN 1

Line 22, "characters" should read --characters,--.
    Line 23, "characters," should read --character--.

COLUMN 4

Lines 21-22, "judgment" should read --carrier--.
    Line 31, "judgement" should read --judgment--.
    Lines 50-51, "condition" should read --conditions--.

COLUMN 5

Line 7, "judgement" should read --judgment--.
    Line 19, "judgement" should read --judgment--.

Signed and Sealed this

Twenty-third Day of February, 1993

*Attest:*

STEPHEN G. KUNIN

*Attesting Officer*     *Acting Commissioner of Patents and Trademarks*